United States Patent
Yamagishi et al.

(10) Patent No.: US 10,544,287 B2
(45) Date of Patent: Jan. 28, 2020

(54) RUBBER COMPOSITION FOR TIRE

(71) Applicant: BRIDGESTONE CORPORATION, Tokyo (JP)

(72) Inventors: Junichi Yamagishi, Tokyo (JP); Shinichi Musha, Tokyo (JP); Yoshihiko Kanatomi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/514,620

(22) PCT Filed: Sep. 28, 2015

(86) PCT No.: PCT/JP2015/077401
§ 371 (c)(1),
(2) Date: Mar. 27, 2017

(87) PCT Pub. No.: WO2016/052448
PCT Pub. Date: Apr. 7, 2016

(65) Prior Publication Data
US 2017/0233557 A1    Aug. 17, 2017

(30) Foreign Application Priority Data

Oct. 1, 2014  (JP) .................. 2014-203528

(51) Int. Cl.
*C08L 7/00*     (2006.01)
*C08K 3/22*     (2006.01)

(52) U.S. Cl.
CPC . *C08L 7/00* (2013.01); *C08K 3/22* (2013.01)

(58) Field of Classification Search
CPC .................. C08L 61/12; C08G 8/22
See application file for complete search history.

(56) References Cited

U.S. PATENT DOCUMENTS

| 4,837,086 A  * | 6/1989 | Takahashi | C08G 8/24 428/506 |
| 2006/0069191 A1* | 3/2006 | Durairaj | C08G 8/10 524/284 |

(Continued)

FOREIGN PATENT DOCUMENTS

| JP | 50-154385 A | 12/1975 |
| JP | 03-255186 A | 11/1991 |
| JP | 06-184284 A | 7/1994 |
| JP | 06184284 A * | 7/1994 |
| JP | 06-234824 A | 8/1994 |
| JP | 2014-80502 A | 5/2014 |

(Continued)

OTHER PUBLICATIONS

International Search Report for PCT/JP2015/077401 dated Dec. 15, 2015.
Communication dated Jul. 4, 2017 from the European Patent Office in counterpart application No. 15846150.9.
WPI, 2017 Clarivate Analytics, XP-002770683, Aug. 25, 2014. (2 pages total).

(Continued)

*Primary Examiner* — Michael M Dollinger
(74) *Attorney, Agent, or Firm* — Sughrue Mion, PLLC

(57) ABSTRACT

The rubber composition of the present invention is prepared by mixing a rubber component (A), zinc oxide (B), and a co-condensate (C) having a softening point of 150° C. or lower and containing a p-tert-butylphenol-derived constituent unit represented by the following formula (1), an o-phenylphenol-derived constituent unit represented by the following formula (2) and a resorcinol-derived constituent unit represented by the following formula (3), wherein the nitrogen adsorption specific surface area ($N_2SA$) of the zinc oxide (B) measured according to the BET method is 6 $m^2/g$ or more and 110 $m^2/g$ or less, the mixing amount of the zinc oxide (B) is 5 parts by mass or more and 13 parts by mass or less based on 100 parts by mass of the rubber component (A), and the mixing amount of the co-condensate (C) is 0.1 parts by mass or more and 10 parts by mass or less based on 100 parts by mass of the rubber component (A). The co-condensate (C) is usable as a replacement for p-tert-octylphenol and p-nonylphenol, has a softening point lower than the maximum temperature in a rubber processing step, and has excellent dispersibility in rubber.

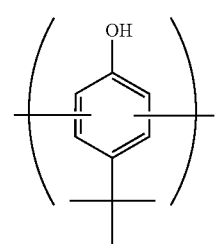

(1)

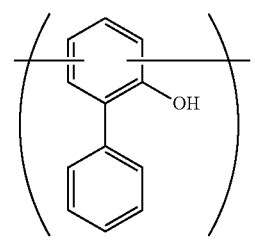

(2)

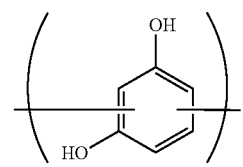

(3)

7 Claims, No Drawings

(56) References Cited

U.S. PATENT DOCUMENTS

| | | | | |
|---|---|---|---|---|
| 2006/0241276 A1* | 10/2006 | Inatomi | ............... | C08G 8/04 |
| | | | | 528/129 |
| 2010/0200141 A1* | 8/2010 | Yamamoto | ............ | B60C 1/00 |
| | | | | 152/527 |
| 2012/0101211 A1* | 4/2012 | Fujiki | ................ | C08G 8/22 |
| | | | | 524/511 |
| 2013/0153110 A1 | 6/2013 | Miyazaki | | |

FOREIGN PATENT DOCUMENTS

| | | | |
|---|---|---|---|
| JP | 2014-152220 A | | 8/2014 |
| JP | 2015-052097 A | | 3/2015 |
| JP | 2015-163668 A | | 9/2015 |
| JP | 2017082069 A | * | 5/2017 |
| WO | 01/83603 A1 | | 11/2001 |
| WO | 2014/156870 A1 | | 10/2014 |

OTHER PUBLICATIONS

WPI, 2017 Clarlvate Analytics, XP-002770684, May 8, 2014. (2 pages total).

* cited by examiner

RUBBER COMPOSITION FOR TIRE

CROSS REFERENCE TO RELATED APPLICATIONS

This application is a National Stage of International Application No. PCT/JP2015/077401 filed Sep. 28, 2015, claiming priority based on Japanese Patent Application No. 2014-203528 filed Oct. 1, 2014, the contents of all of which are incorporated herein by reference in their entirety.

TECHNICAL FIELD

The present invention relates to a rubber composition for tires using a co-condensate obtained from an alkylphenol, resorcinol and others.

BACKGROUND ART

Rubber products, such as tires, belts, hoses, etc., are reinforced with a reinforcing material such as steel cords, organic fibers, etc. In these rubber products, the rubber and the reinforcing material are desired to be bonded firmly to each other.

For bonding rubber and a reinforcing material, there is a method of using an adhesive. As one example, there is known a method of compounding and kneading an adhesive along with other various compounding ingredients in a kneading step of a rubber processing step, wherein a co-condensate obtained by further reacting resorcinol with a co-condensate obtained by reacting an alkylphenol such as p-tert-octylphenol, p-nonylphenol or the like with formalins is used as an adhesive in the rubber processing step (see PTL 1).

However, p-tert-octylphenol, p-nonylphenol are said to be candidate substances of SVHC defined in a regulation in EU states, REACH (Registration, Evaluation, Authorization and Restriction of Chemicals), and the possibility that use of the substances in EU states will be restricted is getting higher.

Given the situation, it is proposed to use alternative compounds not listed as candidate substances of SVHC defined in the regulation REACH so as to produce an adhesive to a reinforcing material. As one example, it is proposed to produce a co-condensate with resorcinol using p-tert-butylphenol in place of p-tert-octylphenol.

Further, it is preferable to reduce free components in the co-condensate in consideration of the working environment.

CITATION LIST

Patent Literature

PTL 1: JP-A 06-234824

SUMMARY OF INVENTION

Technical Problem

An object of the present invention is to provide a rubber composition for tires that is excellent in initial adhesiveness and wet-heat adhesiveness without using p-tert-octylphenol and p-nonylphenol whose use may be probably restricted by legal restraints in rubber products reinforced with a reinforcing material such as steel cords or the like.

Solution to Problem

The present inventors have found that, in a rubber product reinforced with a reinforcing material such as steel cords or the like, a co-condensate further containing an o-phenylphenol-derived constituent unit in addition to p-tert-butylphenol and resorcinol-derived constituent units can be used as an adhesive.

In addition, the inventors have found that using the adhesive along with zinc oxide having a specific surface area further improves initial adhesiveness and wet-heat adhesiveness. The present invention has been made on the basis of these findings.

Specifically, the rubber composition for tires of the present invention is prepared by mixing a rubber component (A), zinc oxide (B), and a co-condensate (C) having a softening point of 150° C. or lower and containing a p-tert-butylphenol-derived constituent unit represented by the following formula (1), an o-phenylphenol-derived constituent unit represented by the following formula (2) and a resorcinol-derived constituent unit represented by the following formula (3), wherein the nitrogen adsorption specific surface area ($N_2SA$) of the zinc oxide (B) measured according to the BET method is 6 $m^2/g$ or more and 110 $m^2/g$ or less, the mixing amount of the zinc oxide (B) is 5 parts by mass or more and 13 parts by mass or less based on 100 parts by mass of the rubber component (A), and the mixing amount of the co-condensate (C) is 0.1 parts by mass or more and 10 parts by mass or less based on 100 parts by mass of the rubber component (A).

[Chemical Formula 1]

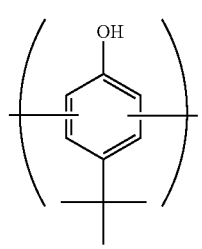

(1)

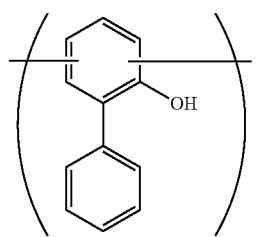

(2)

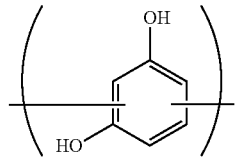

(3)

Advantageous Effects of Invention

According to the present invention, there can be provided a rubber composition for tires that is excellent in initial adhesiveness and wet-heat adhesiveness without using p-tert-octylphenol and p-nonylphenol whose use may be probably restricted by legal restraints in rubber products reinforced with a reinforcing material such as steel cords or the like.

DESCRIPTION OF EMBODIMENTS

[Rubber Composition]

The rubber composition for tires of an embodiment of the present invention is described in detail hereinunder.

The rubber composition for tires of this embodiment is prepared by mixing a rubber component (A), zinc oxide (B), and a co-condensate (C) having a softening point of 150° C. or lower and containing a p-tert-butylphenol-derived constituent unit represented by the following formula (1), an o-phenylphenol-derived constituent unit represented by the following formula (2) and a resorcinol-derived constituent unit represented by the following formula (3), wherein the nitrogen adsorption specific surface area ($N_2SA$) of the zinc oxide (B) according to the BET method is 6 $m^2/g$ or more and 110 $m^2/g$ or less, the mixing amount of the zinc oxide (B) is 5 parts by mass or more and 13 parts by mass or less based on 100 parts by mass of the rubber component (A), and the mixing amount of the co-condensate (C) is 0.1 parts by mass or more and 10 parts by mass or less based on 100 parts by mass of the rubber component (A).

[Chemical Formula 2]

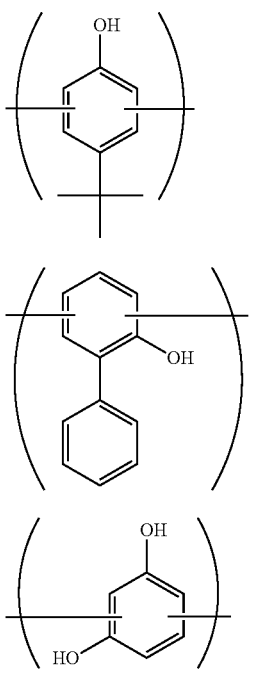

<Rubber Component (A)>

Examples of the rubber component (A) to be mixed in the rubber composition for tires of the embodiment of the present invention include natural rubber, epoxidized natural rubber, deproteinized natural rubber and other modified natural rubbers, as well as synthetic rubbers such as polyisoprene rubber (IR), styrene-butadiene copolymer rubber (SBR), polybutadiene rubber (BR), acrylonitrile-butadiene copolymer rubber (NBR), isoprene-isobutylene copolymer rubber (IIR), ethylene-propylene-diene copolymer rubber (EPDM), halogenobutyl rubber (HR), etc. Among these, natural rubber, higher unsaturated rubbers such as polyisoprene rubber, styrene-butadiene copolymer rubber, polybutadiene rubber and the like are preferably used, and especially preferably natural rubber and/or polyisoprene rubber are used. In addition, combining a few kinds of rubber components such as combined use of natural rubber and styrene-butadiene copolymer rubber, combined use of natural rubber and polybutadiene rubber or the like is also effective.

Examples of natural rubber include natural rubber grades of RSS#1, RSS#3, TSR20, SIR20, etc. As the epoxidized natural rubber, one having an epoxidation degree of 10 to 60 mol % is preferred, and examples thereof include ENR25 and ENR50 manufactured by Kumpulan Guthrie Berhad. As the deproteinized natural rubber, deproteinized natural rubber having a total nitrogen content of 0.3% by mass or less is preferred. As the modified natural rubber, a polar group-containing modified natural rubber produced by previously reacting natural rubber with 4-vinylpyridine, an N,N-dialkylaminoethyl acrylate such as N,N-diethylaminoethyl acrylate or the like, 2-hydroxyacrylate or the like is preferably used.

Examples of the styrene-butadiene copolymer rubber (SBR) include emulsion-polymerized SBR and solution-polymerized SBR described in pages 210 to 211 of "Handbook of Rubber Industry, 4th Ed." edited by Society of Rubber Industry, Japan. Among these, in particular, use of solution-polymerized SBR is preferred.

As commercial products of solution-polymerized SBR, solution-polymerized SBR whose molecular terminals have been modified with 4,4'-bis(dialkylamino)benzophenone such as "Nipol (registered trademark" NS116" manufactured by Zeon Corporation, etc., solution-polymerized SBR whose molecular terminals have been modified with a tin halide compound such as "SL574" manufactured by JSR Corporation, etc., and silane-modified solution-polymerized SBR such as "E10" and "E15" manufactured by Asahi Kasei Corp. and others are preferably used.

In addition, solution-polymerized SBR having any of nitrogen, tin or silicon or a plurality of such chemical elements at the molecular terminals, which is obtained by modifying molecular terminals thereof using singly any one of a lactam compound, an amide compound, a urea compound, an N,N-dialkylacrylamide compound, an isocyanate compound, an imide compound, a silane compound such as an alkoxy group-having trialkoxysilane compound or the like, or an aminosilane compound, or using two or more different kinds of compounds such as a tin compound and an alkoxy group-having silane compound, or an alkylacrylamide compound and an alkoxy group-having silane compound or the like, is especially preferably used.

Examples of the polybutadiene rubber (BR) include solution-polymerized BR such as a high-cis BR in which the cis-1,4 bond accounts for 90% or more, a low-cis BR in which the cis-bond accounts for 35% or so, etc., and a low-cis BR having a high vinyl content is preferably used. As commercial products of BR, tin-modified BR such as "Nipol (registered trademark) BR 1250H" manufactured by Zeon Corporation or the like is preferably used.

In addition, solution-polymerized BR having any of nitrogen, tin or silicon or a plurality of such elements at the molecular terminals, which is obtained by modifying molecular terminals thereof using singly any one of 4,4'-bis(dialkylamino)benzophenone, a tin halide compound, a lactam compound, an amide compound, an urea compound, an N,N-dialkylacrylamide compound, an isocyanate compound, an imide compound, a silane compound such as an alkoxy group-having trialkoxysilane compound or the like, or an aminosilane compound; or using two or more different kinds of compounds such as a tin compound and an alkoxy group-having silane compound, or an alkylacrylamide compound and an alkoxy group-having silane compound or the like, is especially preferably used.

The rubber component preferably contains natural rubber, and the above-mentioned BR is generally used as mixed with natural rubber. The proportion of natural rubber that occupies the rubber component (A) is preferably 70% by mass or more.

<Zinc Oxide (B)>

The zinc oxide (B) to be mixed in the rubber composition for tires of this embodiment has 6 $m^2/g$ or more and 110 $m^2/g$ or less, when measuring the nitrogen adsorption specific surface area ($N_2SA$) according to the BET method. The zinc oxide (B) is generally referred to as zinc flower.

In this embodiment, the specific surface area of the zinc oxide (B) is the nitrogen adsorption specific surface area ($N_2SA$) to be measured according to the BET method defined in ASTM D4567-03 (2007), and this is expressed as "BET specific surface area" hereinunder.

When the BET specific surface area of the zinc oxide (B) is less than 6 $m^2/g$, the activation effect thereof as a vulcanization activator is insufficient and initial adhesiveness may therefore lower. When the BET specific surface area of the zinc oxide (B) is more 110 $m^2/g$, over-vulcanization may occur and wet-heat adhesiveness may therefore lower.

From these viewpoints, the lower limit of the BET specific surface area of the zinc oxide (B) is preferably 7 $m^2/g$ or more, more preferably 8 $m^2/g$ or more, even more preferably 40 $m^2/g$ or more. The upper limit of the BET specific surface area is preferably 80 $m^2/g$ or less, more preferably 55 $m^2/g$ or less, even more preferably 10 $m^2/g$ or less.

Preferably, the zinc oxide (B) is one prepared by mixing one zinc oxide having 40 $m^2/g$ or more and 55 $m^2/g$ or less in a nitrogen adsorption specific surface area ($N_2SA$) measured according to the BET method, and another zinc oxide having 6 $m^2/g$ or more and 10 $m^2/g$ or less in a nitrogen adsorption specific surface area ($N_2SA$) measured according to the BET method.

The mixing amount of the zinc oxide (B) must be 5 parts by mass or more and 13 parts by mass or less based on 100 parts by mass of the rubber component (A).

When the mixing amount of the zinc oxide (B) is less than 5 parts by mass based on 100 parts by mass of the rubber composition (A), a sufficient vulcanization activating effect could not be obtained and initial adhesiveness would therefore lower. On the other hand, when the mixing amount of the zinc oxide (B) is more than 13 parts by mass based on 100 parts by mass of the rubber component (A), over-vulcanization may occur and both initial adhesiveness and wet-heat adhesiveness may therefore lower.

From these viewpoints, the mixing amount of the zinc oxide (B) is preferably 6 parts by mass or more and 12 parts by mass or less based on 100 parts by mass of the rubber component (A), more preferably 7 parts by mass or more and 11 parts by mass or less based on 100 parts by mass of the rubber component (A).

Only importance for the zinc oxide (B) to be mixed in the rubber composition for tires of this embodiment is that the nitrogen adsorption specific surface area ($N_2SA$) thereof according to the BET method is 6 $m^2/g$ or more and 110 $m^2/g$ or less, and therefore, active zinc oxide produced according to a wet method or ordinary zinc oxide produced according to a dry method, or a mixture of these two may be used.

<Co-Condensate (C)>

The co-condensate (C) contains a p-tert-butylphenol-derived constituent unit represented by the following formula (1), an o-phenylphenol-derived constituent unit represented by the following formula (2) and a resorcinol-derived constituent unit represented by the following formula (3).

[Chemical Formula 3]

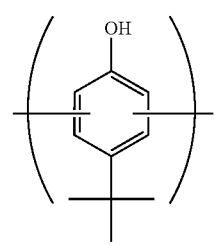

(1)

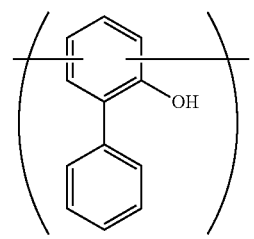

(2)

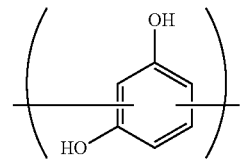

(3)

In general, these constituent units are contained in the main chain of the co-condensate, but may be contained in the side chain thereof, as the case may be. Among these constituent units, in the case where the o-phenylphenol-derived constituent unit (2) is not contained, the softening point maybe high and there may occur a dispersion failure problem in mixing in rubber during kneading and, as a result, the co-condensate would be insufficient as an adhesive for rubber and a reinforcing material to be used by mixing in rubber during kneading. On the other hand, in the case where the resorcinol-derived constituent unit (3) is not contained, the co-condensate could not sufficiently exhibit the ability as an adhesive for rubber and a reinforcing material to be used by mixing in rubber during kneading. Further, in the case where the p-tert-butylphenol-derived constituent unit (1) is not contained, the cost of the co-condensate is extremely high, and accordingly, an industrially advantageous co-condensate could not be obtained.

The content ratio of these constituent units is that the o-phenylphenol-derived constituent unit (2) is from 0.5 to 6 times by mol based on 1 mol of the p-tert-butylphenol-derived constituent unit (1), more preferably 1.5 to 6 times by mol based on 1 mol of the p-tert-butylphenol-derived constituent unit (1). When the amount is less than 0.5 times by mol, the softening point may be too high and therefore may cause the above-mentioned problems, but when more than 6 times by mol, the material cost of the co-condensate is high and therefore, as the case may be, the co-condensate for the present invention could not be produced industrially advantageously.

The resorcinol-derived constituent unit (3) is contained generally in an amount of 0.5 to 2.0 times by mol based on 1 mol of the total of the p-tert-butylphenol-derived constituent unit (1) and the o-phenylphenol-derived constituent unit (2). When the amount is less than 0.5 times by mol, the ability as an adhesive for rubber and a reinforcing agent to be used by mixing in rubber during kneading could not be sufficiently exhibited, but one containing it in an amount of more than 2.0 times by mol would be difficult to produce industrially, as the case may be.

These constituent units are generally bonded by a bonding group such as an alkyl group and/or an alkyl ether group derived from aldehyde to be used in reaction. Above all, the bonding group is preferably a methylene group and/or a dimethylene ether group derived from formaldehyde. The bonding group is contained generally in an amount of 1 to 2 times by mol based on 1 mol of the total amount of the p-tert-butylphenol-derived constituent unit (1) and the o-phenylphenol-derived constituent unit (2).

The ratio of these constituent units and the bonding group may be determined by analyzing the co-condensate with $^1$H-NMR. Specifically, a method is exemplified where a co-condensate is analyzed through $^1$H-NMR, and among the resultant analytical data, the ratio is determined from the proton integral values derived from each constituent unit and the bonding group.

The co-condensate (C) usable in the rubber composition of this embodiment of the present invention may contain, as needed, any other constituent units than the p-tert-butylphenol, o-phenylphenol and resorcinol-derived constituent units. As examples of such constituent units, there are exemplified constituent units derived from various alkylphenols that are used as starting materials for co-condensates generally for use as adhesives in a rubber processing step.

The softening point of the co-condensate (C) must be 150° C. or lower. The softening point is preferably within a range of 80° C. or higher and 150° C. or lower, more preferably within a range of 80° C. or higher and 140° C. or lower, especially preferably within a range of 90° C. or higher and 120° C. or lower.

When the softening point of the co-condensate (C) is higher than 150° C., there occurs a problem of dispersion failure in the rubber composition in mixing the co-condensate in the composition during kneading the composition, and as a result, the co-condensate may be unsuitable as an adhesive for rubber and a reinforcing agent to be used by mixing it in rubber during kneading. When the softening pint is lower than 80° C., the co-condensate may block during storage, as the case may be.

In the rubber composition of this embodiment, the co-condensate (C) must be contained in an amount of 0.1 parts by mass or more and 10 parts by mass or less based on 100 parts by mass of the rubber component (A).

When the mixing amount of the co-condensate (C) is less than 0.1 parts by mass based on 100 parts by mass of the rubber component (A), sufficient adhesiveness (wet-heat adhesiveness) could not be obtained.

When the mixing amount of the co-condensate (C) is more than 10 parts by mass based on 100 parts by mass of the rubber component (A), adhesion reaction may run on excessively during vulcanization to thereby lower the adhesiveness (wet-heat adhesiveness).

From the above-mentioned viewpoints, the co-condensate (C) is preferably 0.2 parts by mass or more and 8 parts by mass or less based on 100 parts by mass of the rubber component (A), more preferably 0.5 parts by mass or more and 6 parts by mass or less based on 100 parts by mass of the rubber component (A).

The total amount of the unreacted monomers (free p-tert-butylphenol, o-phenylphenol and resorcinol) and the remaining solvent, which are contained in the co-condensate (C), is preferably 15% by mass or less. When the amount is 15% by mass or less, an odor during kneading operation can be reduced favorably in environmental aspects.

Especially, the content of free resorcinol is preferably 12% by mass or less. When the content of free resorcinol is 12% by mass or less, resorcinol vaporization to occur in adding the co-condensate (C) to rubber and during kneading the rubber can be retarded, by which especially preferably, the working environment can be greatly improved.

The total amount of the other unreacted monomers, p-tert-butylphenol and o-phenylphenol than free resorcinol, and the remaining solvent that may be used in the reaction, which are contained in the co-condensate (C), is preferably 5% by mass or less. When the amount is 5% by mass or less, an odor can be reduced and the volatile organic compounds can also be reduced favorably from the environmental aspects, and more preferably the amount is 3% by mass or less.

From the above-mentioned viewpoints, the total amount of the other unreacted monomers than free resorcinol and the remaining solvent to be contained in the rubber composition for tires of the present invention is preferably 0.20% by mass or less based on the rubber component, more preferably 0.17% by mass or less based on the rubber component.

<Filler>

A filler may be mixed in the rubber composition for tires of this embodiment, as needed. The filler is preferably at least one selected from carbon black and an inorganic filler. In this embodiment, carbon black is not contained in an inorganic filler.

In the rubber composition of this embodiment, the total amount of carbon black and the inorganic filler to be used is preferably 5 parts by mass or more and 100 parts by mass or less based on 100 parts by mass of the rubber component (A). When the amount is 5 parts by mass or more, it is favorable from the viewpoint of improving wet-heat adhesiveness. When the amount is 100 parts by mass or less, it is favorable from the viewpoint of improving low-heat-generation property. From this viewpoint, the total amount of the inorganic filler and carbon black is more preferably 20 parts by mass or more and 80 parts by mass or less based on 100 parts by mass of the rubber component (A), even more preferably 20 parts by mass or more and 70 parts by mass or less based on 100 parts by mass of the rubber component (A), and especially preferably 30 parts by mass or more and 70 parts by mass or less.

Regarding the filler, the inorganic filler may be mixed as needed. When the proportion of carbon black in the filler is higher, the viscosity increase of the rubber composition in an unvulcanized state can be reduced and the dispersion effect by kneading could be high. Accordingly, the proportion of carbon black in the filler is preferably 80% by mass or more, and more preferably 100% by mass.

<Carbon Black>

When containing carbon black, the rubber composition for tires of this embodiment can enjoy an effect of decreasing electric resistance and preventing static charge.

Preferred examples of carbon black to be used include carbon black of the grades SAF, ISAF, IISAF, N339, HAF, FEF, GPF and SRF, with high, medium or low structure, and especially preferred examples among these include carbon black of the grades SAF, ISAF, IISAF, N339, HAF and FEF. The nitrogen adsorption specific surface area ($N_2SA$, as measured according to JIS K 6217-2:2001) of the carbon black is preferably 30 $m^2/g$ or more and 250 $m^2/g$ or less. One alone of the above-mentioned carbon blacks may be used singly, or two or more of them may be used as combined.

<Inorganic Filler>

An inorganic filler may be mixed, as needed, in the rubber composition for tires of this embodiment. The inorganic filler used in this embodiment includes silica and at least one selected from inorganic compounds represented by the following general formula (I).

$$dM^1 \cdot xSiO_y \cdot zH_2O \quad (I)$$

wherein, in the general formula (I), $M^1$ is at least one selected from a metal selected from aluminum, magnesium, titanium, calcium and zirconium, and oxides or hydroxides of those metals, their hydrates and carbonates of the metals; d, x, y and z each indicate an integer of 1 to 5, an integer of 0 to 10, an integer of 2 to 5, and an integer of 0 to 10, respectively.

In the general formula (I), when x and z are both 0, the inorganic compound is at least one metal selected from aluminum, magnesium, titanium, calcium and zirconium, or a metal oxide or a metal hydroxide thereof.

In this embodiment of the present invention, the above-mentioned inorganic filler is preferably silica from the viewpoint of low rolling property.

In the case where silica is used as the inorganic filler, the BET specific surface area of the silica (as measured according to ISO5794/1) is preferably 40 $m^2/g$ or more and 350 $m^2/g$ or less. Silica whose BET specific surface area falls within the above range has an advantage that it can realize both rubber reinforcing performance and dispersibility in a rubber component. From this viewpoint, silica whose BET specific surface area falls within a range of 80 $m^2/g$ or more and 350 $m^2/g$ or less is more preferred, and silica whose BET specific surface area falls within a range of 120 $m^2/g$ or more and 350 $m^2/g$ or less is especially preferred.

A commercial product can be used as silica, and above all, use of wet-process silica, dry-process silica or colloidal silica is preferred, and use of wet-process silica is especially preferred.

As silica of those types, commercial products of "Ultrasil (registered trademark) VN3" manufactured by Degussa (BET specific surface area=175 $m^2/g$), etc., as well as "Ultrasil (registered trademark) 360", "Ultrasil (registered trademark) 7000", and "Zeosil (registered trademark) 115GR", "Zeosil (registered trademark) 1115MP", "Zeosil (registered trademark) 1205MP" and "Zeosil (registered trademark) Z85MP" manufactured by Rhodia Japan, "Nipsil (registered trademark) AQ" manufactured by Tosoh Silica Corporation and others are preferably used.

In the case where an inorganic compound represented by the general formula (I) is mixed as the inorganic filler, alumina ($Al_2O_3$) such as γ-alumina and α-alumina; alumina hydrate ($Al_2O_3 \cdot H_2O$) such as boemite and diaspora; aluminum hydroxide ($Al(OH)_3$) such as gibbsite and bayerite; aluminum carbonate ($Al_2(CO_3)_3$); magnesium hydroxide ($Mg(OH)_2$); magnesium oxide (MgO); magnesium carbonate ($MgCO_3$); talc ($3MgO \cdot 4SiO_2 \cdot H_2O$); attapulgite ($5MgO \cdot 8SiO_2 \cdot 9H_2O$); titanium white ($TiO_2$); titanium black ($TiO_{2n-1}$); calcium oxide (CaO); calcium hydroxide ($Ca(OH)_2$); aluminum magnesium oxide ($MgO \cdot Al_2O_3$); clay ($Al_2O_3 \cdot 2SiO_2$); kaolin ($Al_2O_3 \cdot 2SiO_2 \cdot 2H_2O$); pyrophyllite ($Al_2O_3 \cdot 4SiO_2 \cdot H_2O$); bentonite ($Al_2O_3 \cdot 4SiO_2 \cdot 2H_2O$); aluminum silicate (such as $Al_2SiO_5$ and $Al_4 \cdot 3SiO_4 \cdot 5H_2O$), magnesium silicate (such as $Mg_2SiO_4$ and $MgSiO_3$); calcium silicate (such as $Ca_2SiO_4$); aluminum calcium silicate (such as $Al_2O_3 \cdot CaO \cdot 2SiO_2$); magnesium calcium silicate ($CaMgSiO_4$); calcium carbonate ($CaCO_3$); zirconium oxide ($ZrO_2$); zirconium hydroxide ($ZrO(OH)_2 \cdot nH_2O$); zirconium carbonate ($Zr(CO_3)_2$); crystalline aluminosilicate salts and the like containing hydrogen, an alkali metal or an alkaline earth metal, which compensates the charge, such as various kinds of zeolite can be used. Furthermore, it is preferable that $M^1$ in the general formula (I) is at least one selected from metallic aluminum, an oxide or a hydroxide of aluminum, hydrates thereof, and aluminum carbonate.

As the aluminum hydroxide that can be mixed in the rubber composition for tires of this embodiment, aluminum hydroxide whose nitrogen adsorption specific surface area is 5 $m^2/g$ or more and 250 $m^2/g$ or less and whose DOP oil absorption amount is 50 ml/100 g or more and 100 ml/100 g or less is preferred.

One alone or two or more of these inorganic compounds represented by the general formula (I) may be used either singly or as combined.

As the inorganic filler in this embodiment, silica alone may be used, or silica and one or more inorganic compounds represented by the general formula (I) may be used as combined.

<Silane Coupling Agent>

A silane coupling agent may be further mixed in the rubber composition for tires of this embodiment where an inorganic filler including silica is mixed therein, for the purpose of further improving reinforcing performance and fuel consumption reduction with the rubber composition for tires.

Examples of the silane coupling agent include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzoyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, 3-ocatanoylthiopropyltriethoxysilane, etc. Among these, bis(3-triethoxysilylpropyl) polysulfide, 3-octanoylthiopropyltriethoxysilane and 3-trimethoxysilylpropylbenzothiazyl tetrasulfide are preferred from the viewpoint of the reinforcing performance improving effect, etc.

One alone or two or more kinds of these silane coupling agents may be used either singly or as combined.

From the viewpoint of the effect as the coupling agent and for preventing gelation, a preferred compounding amount of the silane coupling agent is preferably, as a ratio by mass (silane coupling agent/silica), (1/100) to (20/100). When the ratio is (1/100) or more, the effect of improving low-heat-generation property of the rubber composition for tires can be more favorably exhibited, and when (20/100) or less, the cost of the rubber composition can be reduced to improve the economic potential thereof. Further, the ratio by mass is more preferably (3/100) to (20/100), and the ratio by mass is especially preferably (4/100) to (10/100).

<Methylene Donor Compound>

The methylene donor compound that can be mixed in the rubber composition for tires of this embodiment includes those generally used in the rubber industry, such as hexakis(methoxymethyl)melamine (HMMM), hexamethylenetetramine (HMT), pentakis(methoxymethyl)methylolmelamine, tetrakis(methoxymethyl)dimethylolmelamine, etc. Above all, hexakis(methoxymethyl)melamine alone or a mixture containing it as the main ingredient is preferred. One alone or two or more kinds of these methylene donor compounds may be used either singly or as combined, and the compounding amount thereof is preferably within a range of 0.5 parts by mass or more and 4 parts by mass or less based on 100 parts by mass of the rubber component (A), more preferably within a range of 1 part by mass or more and 3 parts by mass or less based on 100 parts by mass of the rubber component (A).

<Organic Cobalt Compound>

Examples of an organic cobalt compound that can be mixed in the rubber composition for tires of this embodiment include acid cobalt salts such as cobalt versatate, cobalt neodecanoate, cobalt rhodinate, cobalt naphthenate, cobalt stearate, etc., and fatty acid cobalt/boron complex compounds (e.g., trade name "Manobond C (registered trademark)", manufactured by Rhodia Japan), etc. The amount of the organic cobalt compound to be used is preferably within a range of 0.05 parts by mass or more and 0.4 parts by mass or less based on 100 parts by mass of the rubber component (A).

<Hydrocarbon Resin>

One or more hydrocarbon resins selected from alicyclic hydrocarbon resins, aliphatic hydrocarbon resins and aromatic hydrocarbon resins may be added, as needed, to the rubber composition for tires of this embodiment, in addition to the co-condensate (C). Here, the alicyclic hydrocarbon resins are petroleum resins that are produced from cyclopentadiene extracted from the C5 fraction of petroleum and/or dicyclopentadiene produced by dimerizing cyclopentadiene, as the main raw materials. The aliphatic hydrocarbon resins are petroleum resins produced from the C5 fraction of petroleum as the main raw material, and the aliphatic hydrocarbon resins are petroleum resins produced from the C9 fraction of petroleum as the main raw material.

Among these hydrocarbon resins, the dicyclopentadiene resin (DCPD resin) produced from a high-purity dicyclopentadiene, which is produced by dimerizing cyclopentadiene, as the main raw material, is preferred from the viewpoint of enhancing rubber reinforcing performance.

Preferred examples of the dicyclopentadiene resin include Quinton 1000 Series (Quinton 1105, Quinton 1325, Quinton 1340) and others manufactured by Zeon Corporation.

The amount of the hydrocarbon resin to be used is preferably 0.1 parts by mass or more and 10 parts by mass or less based on 100 parts by mass of the rubber component, more preferably 0.1 parts by mass or more and 5 parts by mass or less based on 100 parts by mass of the rubber component.

<Other Additives>

If desired and within a range not detracting from the advantageous effects of the present invention, various chemicals generally used in the rubber industry, for example, a vulcanizing agent, a vulcanization accelerator, a vulcanization retardant, a process oil, an antiaging agent, an organic acid and the like may be mixed in the rubber composition for tires of this embodiment of the present invention.

(Vulcanizing Agent)

The vulcanizing agent that can be mixed in the rubber composition for tires of this embodiment includes sulfur, etc. The sulfur component includes powdery sulfur, precipitated sulfur, colloidal sulfur, insoluble sulfur, highly-dispersible sulfur, etc., and powdery sulfur is preferred.

The amount of the vulcanizing agent to be used is preferably 0.1 parts by mass or more and 10 parts by mass or less as the sulfur content based on 100 parts by mass of the rubber component, more preferably 1.0 part by mass or more and 5.0 parts by mass or less based on 100 parts by mass of the rubber component. When the amount is less than 0.1 parts by mass, the breaking strength, the abrasion resistance and the fuel efficiency of the vulcanized rubber may worsen, but when more than 10 parts by mass, the rubber elasticity may be thereby lost.

(Vulcanization Accelerator)

The vulcanization accelerator that can be mixed in the rubber composition for tires of this embodiment includes thiazole-type vulcanization accelerators, sulfenamide-type vulcanization accelerators and guanidine-type vulcanization accelerators described in pages 412 to 413 of Handbook of Rubber Industry <4th Ed.> (Jan. 20, 1994, issued by Society of Rubber Industry, Japan). Among these, for example, there are mentioned N-cyclohexyl-2-benzothiazolyl sulfenamide (CBS), N-tert-butyl-2-benzothiazolyl sulfenamide (BBS), N,N-dicyclohexyl-2-benzothiazolyl sulfenamide (DCBS), 2-mercaptobenzothiazole (MBT) and dibenzothiazyl disulfide (MBTS), diphenylguanidine (DPG).

Above all, N-cyclohexyl-2-benzothiazolyl sulfenamide (CBS), N-tert-butyl-2-benzothiazolyl sulfenamide (BBS), N,N-dicyclohexyl-2-benzothiazolyl sulfenamide (DCBS), or combined use of dibenzothiazyl disulfide (MBTS) and diphenylguanidine (DPG) is preferred.

The amount of the vulcanization accelerator to be used is not specifically limited but preferably falls within a range of 0.5 parts by mass or more and 3 parts by mass or less based on 100 parts by mass of the rubber component. Above all, a range of 0.5 parts by mass or more and 1.5 parts by mass or less based on 100 parts by mass of the rubber component is especially preferred.

(Vulcanization Retardant)

Examples of the vulcanization retardant that can be mixed in the rubber composition of this embodiment include phthalic anhydride, benzoic acid, salicylic acid, N-nitrosodiphenylamine, N-(cyclohexylthio)-phthalimide (CTP), sulfonamide derivatives, diphenylurea, bis(tridecyl)pentaerythritol diphosphite, etc., and N-(cyclohexylthio)-phthalimide (CTP) is preferably used.

(Process Oil)

As the process oil to be used as a softening agent that can be mixed in the rubber composition of the present invention, an aromatic oil is used from the viewpoint of compatibility with SBR. From the viewpoint of placing a significance on low-temperature characteristics, a naphthene oil or a paraffin oil is used. The amount thereof to be used is preferably 0 part by mass or more and 100 parts by mass or less based on 100 parts by mass of the rubber component. When the amount of those is 100 parts by mass or less, it is possible to prevent the tensile strength and the fuel efficiency (low-heat generation property) of vulcanized rubber from worsening.

(Antiaging Agent)

The antiaging agent that can be mixed in the rubber composition for tires of this embodiment includes those described in pages 436 to 443 of "Handbook of Rubber Industry <4th Ed.>" edited by Society of Rubber Industry, Japan. Among these, for example, there are mentioned 3C (N-isopropyl-N'-phenyl-p-phenylenediamine), 6C [N-(1,3-dimethylbutyl)-N'-phenyl-p-phenylenediamine], AW (6-ethoxy-2,2,4-trimethyl-1,2-dihydroquinoline), a high-temperature condensate of diphenylamine and acetone, etc.

The amount of the antiaging agent to be used is preferably 0.1 parts by mass or more and 5.0 parts by mass or less based on 100 parts by mass of the rubber component, more preferably 0.3 parts by mass or more and 3.0 parts by mass or less based on 100 parts by mass of the rubber component.
(Organic Acid)

The organic acid that can be mixed in the rubber composition for tires of this embodiment includes saturated fatty acids and unsaturated fatty acids such as stearic acid, palmitic acid, myristic acid, lauric acid, arachidic acid, behenic acid, lignoceric acid, capric acid, pelargonic acid, caprylic acid, enanthic acid, caproic acid, oleic acid, vaccenic acid, linoleic acid, linolenic acid, nervonic acid, etc., as well as resin acids such as rosin acid, modified rosin acid, etc.

In the production method for the rubber composition of this embodiment, it is preferable that stearic acid accounts for 50 mol % or more of the organic acid among the above-mentioned organic acids, since the organic acid must sufficiently exhibit the function as a vulcanization acceleration aid. 50 mol % or less in the organic acid may be a rosin acid (including a modified rosin acid) and/or a fatty acid that may be contained in the case of producing a styrene-butadiene copolymer through emulsion polymerization.
[Production Method for Co-Condensate (C)]

The production method for the co-condensate in the present invention includes the following steps in the order mentioned below.

(a) A step of reacting a mixture of p-tert-butylphenol and o-phenylphenol with formaldehyde in the presence of an alkali to give a resol-type condensate.

(b) A step of further reacting the above with resorcinol in an amount of 0.8 times by mol based on the total amount of p-tert-butylphenol and o-phenylphenol.

The proportion of o-phenylphenol in the mixture of p-tert-butylphenol and o-phenylphenol to be used in the step (a) (hereinafter these two kinds of phenols may be collectively referred to as "phenol derivatives") is not specifically limited but is preferably 35 mol % to 85 mol % based on the total amount of the phenol derivatives, more preferably 40 mol % to 85 mol %, even more preferably 60 mol % to 85 mol %, based on the total amount of the phenol derivatives. When the proportion is less than 35 mol %, the softening point of the resultant co-condensate may be high and may therefore poorly disperse in kneading with the rubber component. When the proportion is more than 85 mol %, a large amount of expensive o-phenylphenol is needed and the co-condensate could not be produced industrially advantageously. The mixture of p-tert-butylphenol and o-phenylphenol in the present invention includes not only one prepared by mixing them before put into a reactor but also any other to be a mixture in a reactor as a result of putting the two separately into a reactor.

The formaldehyde usable in the step (a) includes a formaldehyde itself and, in addition, an aqueous solution thereof formalin, and a compound easily generating formaldehyde, such as paraformaldehyde and trioxane. The molar ratio of the charge-in quantity of formaldehyde is not specifically limited but is preferably 1 to 3 times by mol based on the total amount of the phenol derivatives, and above all, a range of 1.5 to 2.5 times by mol based on the total amount of the phenol derivatives is especially preferred. When the molar ratio of the charge-in quantity of formaldehyde is less than 1 time by mol, unreacted monomers may increase and odor and volatile organic compounds may increase. When the molar ratio of the charge-in quantity of formaldehyde is more than 3 times by mol, unreacted formaldehyde may remain as such, and the resin may have a three-dimensional structure so as to increase the softening point thereof.

As the alkali, those to be used in producing ordinary resol-type condensates can be used, such as a hydroxide or carbonate of an alkali metal or alkaline earth metal, as well as ammonia and amine. Specific examples of the hydroxide or carbonate of the alkali metal or alkaline earth metal include sodium hydroxide, potassium hydroxide, calcium hydroxide, sodium carbonate, potassium carbonate, etc. Among these, sodium hydroxide and potassium hydroxide are preferred. These alkalis may be used in any form of a solid or an aqueous solution thereof, but from the viewpoint of reactivity and handleability, use of an aqueous solution is preferred. In the case where an aqueous solution is used, the concentration is generally 10% by mass to 50% by mass. The charge-in quantity as a molar ratio of the alkali is not specifically limited but is preferably within a range of 0.03 to 0.6 times by mol based on the total amount of the phenol derivatives, more preferably within a range of 0.03 to 0.3 times by mol based on the total amount of the phenol derivatives.

The reaction of the step (a), that is, in the presence of an alkali, the reaction of a mixture of p-tert-butylphenol and o-phenylphenol with formaldehyde can be carried out in a solvent. The usable solvent is not specifically limited, and water, alcohols, aromatic hydrocarbons and the like are usable. More specifically, water, methanol, ethanol, propanol, butanol, toluene, xylene, ethylbenzene, cumene, monochlorobenzene and others are exemplified. Above all, water, toluene and xylene are preferred. One alone or two or more kinds of these solvents may be used either singly or as combined. In the case where the solvent is used, in general, the amount thereof is 0.4 to 4 times by mass based on the total amount of the phenol derivatives (for example, 0.4 to 2 times by mass). The reaction of the step (a) is generally carried out at a reaction temperature of 40 to 100° C. for 1 to 48 hours (for example, 1 to 8 hours).

The resol-type condensate thus obtained according to such reaction can be used as it is without neutralizing the used alkali, in the reaction of the step (b), that is, in the reaction with resorcinol, or by adding an acid, the alkali may be neutralized before use thereof. The kind of acid to be used in neutralization is not specifically limited, and examples thereof include hydrochloric acid, sulfuric acid, nitric acid, phosphoric acid, formic acid, acetic acid, oxalic acid, p-toluenesulfonic acid, etc. One kind alone of these acids may be used, or two or more kinds thereof may be used as mixed. In this case, the total amount of the acid to be used is not specifically limited, but in general, it is preferable to use an equal amount (based on the substance amount) of an acid based on the alkali used. For removing unreacted formaldehyde and inorganic salts formed by neutralization and others, if necessary, a treatment of extracting the resol-type condensate and a treatment of washing it using an organic solvent not miscible with water may be added.

In the step (b), the molar ratio of the charge-in quantity of resorcinol in reacting the resultant resol-type condensate with resorcinol must be 0.5 times by mol or more based on the total amount of the phenol derivatives, and is preferably 0.8 to 4.0 times by mol, more preferably 0.8 to 2.0 times by mol, even more preferably 1.0 to 2.0 times by mol, based on the total amount of the phenol derivatives. When the amount is more than 4.0 times by mol, much unreacted resorcinol may remain so as to cause a problem of volatility. When less than 0.5 times by mol, the reaction could not finish to fail in expression of the essential performance, reaction between resol-type condensates with each other may run on preferentially so that the resultant co-condensate would have an increased molecular weight, and as a result, the softening point thereof could not be 150° C. or lower.

The reaction between the resol-type condensate and resorcinol can be carried out in the absence of a solvent, but in the case where the reaction is carried out in the presence of a solvent in an amount of 0.2 times by mass or more based on the total amount of p-tert-butylphenol and o-phenylphenol, it is favorable since the amount of free resorcinol can be reduced to 12% by mass or less. More preferably, the reaction is carried out in the presence of a solvent in an amount of 0.4 to 4.0 times by mass based on the total amount of p-tert-butylphenol and o-phenylphenol, especially preferably 0.4 to 2.0 times by mass based on the total amount of p-tert-butylphenol and o-phenylphenol. When the amount is less than 0.2 times by mass, the reaction between the resol-type condensates may run on more preferentially than the reaction between the resol-type condensate with resorcinol, and if so, the resultant co-condensate may have an increased molecular weight or the amount of free resorcinol could not be 12% by mass or less. In addition, when the solvent is used in an amount of 4.0 times by mass or more, the reaction may run on but the volume efficiency may lower and the co-condensate could not be produced advantageous in an economical aspect.

The usable solvent is not specifically limited, and examples thereof include alcohols, ketones, aromatic hydrocarbons, etc. More specifically, methanol, ethanol, propanol, butanol, methyl isobutyl ketone, diisobutyl ketone, cyclohexanone, toluene, xylene, ethylbenzene, cumene, monochlorobenzene and others are exemplified. Among these, ketones and aromatic hydrocarbons are preferred, and further methyl isobutyl ketone, toluene and xylene are preferred. As needed, one alone or two or more kinds of these solvents may be used either singly or as combined. As the above solvent(s), the solvent(s) used in producing the resol-type condensate can be used as it is, or a new solvent(s) may be suitably added.

The reaction between the resol-type condensate and resorcinol is not specifically limited but is generally carried out at a reaction temperature of 40 to 150° C. and a reaction time of 1 to 48 hours (for example, 1 to 8 hours).

In order that the free resorcinol content in the co-condensate could be 12% by mass or less, it is preferable to carry out a reaction at 120° C. or higher until the free resorcinol content in the reaction mixture could be 12% by mass or less before carrying out the solvent removing step to be mentioned hereinunder. In the case where free resorcinol remains in an amount of more than 5% by mass in this reaction step, simultaneous removal of the free resorcinol to be less than 5% by mass in the solvent removing step to be mentioned hereinunder, if desired, would require industrially impracticable conditions of high temperature and highly-reduced pressure, and in addition, the co-condensate to be obtained in this case would be discolored by heat or the molecular weight thereof would increase and, as a result, the softening point thereof may be higher than 150° C. and therefore the co-condensate would be unsuitable as an adhesive for rubber and a reinforcing material to be used by compounding in rubber during kneading.

Reaction at 120° C. or higher means that the reaction system could be at 120° C. or higher at any time during the reaction, and for example, there may be exemplified a method where the reaction is started at a temperature lower than 120° C. in the initial stage, and thereafter the system is gradually heated up to 120° C. or higher. In the case where the reaction temperature could never be 120° C. or higher, the free resorcinol in the reaction mixture could not be 12% by mass or less. In addition, as described above, in the case where this reaction is carried out in the absence of a solvent in an amount of 0.2 times by mass or more, the molecular weight of the resultant co-condensate may increase and therefore the free resorcinol content could not be 12% by mass or less. The reaction mixture indicates everything contained in a reactor, including the resol-type condensate and resorcinol that are the starting materials in this reaction as well as solvents, etc., and the resorcinol content in the reaction mixture can be quantified, for example, by analysis through gas chromatography. For reducing the resorcinol content, a method of merely reducing the amount of the starting material resorcinol to be used may be taken into consideration, but when the co-condensate is produced according to this method, the amount of the starting material resorcinol would become insufficient during the reaction, and instead, the resorcinol site in the co-condensate may further react to increase the molecular weight of the co-condensate so that the softening point thereof would be extremely high.

When water exists in the system in the reaction between the resol-type condensate and resorcinol in the step (b), the reaction speed tends to be low, and the reaction speed would lower owing to water formed by the reaction between the resol-type condensate and resorcinol and, therefore, it is preferable that the reaction is carried out along with dehydration for promoting the reaction. For the dehydration reaction, it is preferable to employ a method where the dehydration is carried out under reduced pressure at the start of the reaction for sufficiently removing water formed in the reaction, and thereafter the system is further dehydrated under normal pressure in order that the inner temperature could be 120° C. or higher.

In the case where a solvent is used in the reaction between the resol-type condensate and resorcinol, in general, the solvent used in the reaction is removed after the reaction. The condition for solvent removal is not specifically limited. For example, it may be carried out under a reduced inner pressure of 45 to 10 kPa and at 120 to 160° C. In this removal operation, the free resorcinol content can be reduced in some degree, but in the case where the free resorcinol content in the reaction mixture before solvent removal is more than 12% by mass, industrially impracticable conditions of high temperature and highly-reduced pressure would be necessary for lowering the free resorcinol content of the co-condensate after solvent removal to 12% by mass or less and, in addition, the co-condensate in the case would be discolored by heat to lower the product's value.

[Preparation of Rubber Composition for Tires]

The rubber composition for tires of this embodiment may be obtained by kneading the above-mentioned various components and additives using a kneading machine, for example, an open kneader such as a roll or the like or a closed kneader such as a Banbury mixer or the like.

Specifically, the rubber composition for tires of this embodiment can be produced by mixing the rubber component (A), zinc oxide (B) and the co-condensate (C) in the first stage of kneading, and then mixing them with a vulcanizing agent and a vulcanization accelerator in the final stage of kneading.

In a stage before the final stage of kneading, a part or all of a vulcanization accelerator may be added and kneaded, and in the final stage of kneading, a vulcanizing agent and the remaining vulcanization accelerator may be mixed to produce the composition. In this case, as the vulcanization accelerator to be added in the stage before the final stage of kneading, at least one compound selected from guanidines, sulfenamides, and thiazoles can be used.

In addition, the rubber composition for tires of this embodiment may contain at least one compound selected from thiourea and diethylthiourea. In this case, in a stage before the final stage of kneading, at least one compound selected from thiourea and diethylthiourea may be added and kneaded, and then in the final stage of kneading, a vulcanizing agent, a vulcanization accelerator and the remaining thiourea and/or diethylthiourea may be mixed to produce the composition.

[Production of Pneumatic Tire]

According to an ordinary tire production method using the rubber composition for tires of this embodiment, tires can be produced. That is, the rubber composition containing the above-mentioned various chemicals is made into various members in an unvulcanized state, then the members are stuck and molded according to an ordinary method on a tire molding machine to form a raw tire. The raw tire is pressed under heat in a vulcanizing machine to give a tire. In that manner, tires with good durability, especially pneumatic tires can be obtained.

EXAMPLES

The present invention is described in more detail with reference to Examples and Comparative Examples given hereinunder, but the present invention is not limited to these. Further, all Examples and Comparative Examples are prophetic data.

[Method for Evaluation of Co-Condensate]

Co-condensates were analyzed and the physical properties thereof were evaluated as follows.

(a) Measurement of Average Molecular Weight of Co-Condensate

The average molecular weight of a co-condensate was calculated as a polystyrene-conversion weight-average molecular weight thereof according to gel permeation chromatography (GPC) for analysis using the apparatus and under the condition mentioned below.

Apparatus used: HLC-8220GPC (manufactured by Tosoh Corporation)
Column: TSK Guard Column SUPER HZ-L (manufactured by Tosoh Corporation)
+TSK-GEL SUPER HZ1000 (4.6 mmϕ×150 mm)
+TSK-GEL SUPER HZ2500 (4.6 mmϕ×150 mm)
+TSK-GEL SUPER HZ4000 (4.6 mmϕ×150 mm)
Column temperature: 40° C.
Injection amount: 10 μL
Carrier and flow rate: tetrahydrofuran 0.35 mL/min
Sample preparation: 0.02 g of a co-condensate was dissolved in 20 mL of tetrahydrofuran.

(b) Measurement of Residual Monomer and Residual Solvent

The remaining monomer and the remaining solvent were quantified according to gas chromatography based on the following condition.

Apparatus used: gas chromatograph GC-14B manufactured by Shimadzu Corporation
Column: glass column, outer diameter 5 mm×inner diameter 3.2 mm×length 3.1 m
Filler: Filler Silicone OV-17 10% Chromosorb WHP 80/100 mesh, max. temp. 340° C.
Column temperature: elevating from 80° C. to 280° C.
Vaporizing chamber temperature: 250° C.
Detector temperature: 280° C.
Detector: FID
Carrier: nitrogen gas (40 ml/min)
Combustion gas: hydrogen (60 kPa), air (60 kPa)
Injection amount: 2 μL About 0.5 g of a co-condensate and, when using anisole as an internal standard, 0.05 g of anisole were dissolved in 10 mL of acetone, and analyzed under the above-mentioned condition. According to an internal standardization method (GC-IS method), the content (%) of the residual solvent and the residual monomer in the co-condensate was measured. The content (%) described in the body context of Examples and Comparative Examples is, unless otherwise specifically indicated, expressed as percentage by mass.

(c) Measurement of Softening Point

The softening point was measured according to JIS-K2207-1996 (ball and ring method).

(d) Content Ratio of Constituent Units in Co-Condensate Resin

A co-condensate resin was analyzed through $^1$H-NMR according to a method based on the following condition.

Apparatus: "JMN-ECS" (400 MHz) manufactured by JEOL Ltd.
Solvent: heavy hydrogen-substituted dimethyl sulfoxide
Chemical shift of constituent components: Based on tetramethylsilane (0 ppm), peaks shown by the following values each were considered as the peak of each component.
Proton of p-tert-butylphenol-derived p-tert-butyl group: 1.0 to 1.2 ppm
Proton of formaldehyde-derived methylene group: 3.4 to 3.9 ppm
Proton of o-phenylphenol-derived o-phenyl group: 7.1 to 7.5 ppm The constituent ratio in the following Examples and Comparative Examples is a ratio based on the following standards.
O-phenylphenol: proportion (time by mol) based on the case when p-tert-butylphenol is 1.
Formaldehyde-derived methylene group: proportion (time by mol) based on the total amount of o-phenylphenol and p-tert-butylphenol.

Production of Co-Condensate

Production Example 1

97.3 g (1.2 mol) of formalin having a purity of 37%, 15.0 g (0.10 mol) of p-tert-butylphenol, 85.0 g (0.50 mol) of o-phenylphenol and 75.4 g of toluene were added to a four-neck separable flask equipped with a reflux condenser and a thermometer, in the above order. Subsequently, this was heated up to an internal temperature of 45° C., and 20 g (0.12 mol) of an aqueous solution of 24% sodium hydroxide was added and stirred until heat generation stopped. After heat generation was confirmed to have stopped, this was heated up to an internal temperature of 65° C. and kept warmed at the temperature for 2 hours. Subsequently, this was again heated up to an internal temperature of 80° C., and further kept warmed for 4 hours.

After the reaction, this was cooled down to an internal temperature of 65° C. or lower, and neutralized with, as added thereto, 49 g of water and 7.55 g (1.13 mol) of oxalic acid dehydrate, then after addition of 22.6 g of toluene, this was left to stand as such, and the water layer was removed.

62.7 g (0.57 mol) of resorcinol was added, then heated up to an internal temperature of 70° C., and processed for azeotropic dehydration under reduced pressure over 4 hours. During this, the inner temperature increased up to 90° C. Subsequently, this was heated under normal pressure up to an internal temperature of 115° C., and then processed for azeotropic dehydration for 1 hour. After that, this was heated up to an internal temperature of 145 to 150° C., and kept warmed for 2 hours to remove the solvent toluene through evaporation. Subsequently, while kept at an internal temperature of 140 to 150° C., this was depressurized down to 16 kPa, and kept warmed for 2 hours for further removal of the solvent toluene through distillation. According to the foregoing operation, 177 g of an orange co-condensate was obtained.

The average molecular weight of the co-condensate: 2160, the softening point of the co-condensate: 123° C., the residual toluene content in the co-condensate: 1.1%, the residual p-tert-butylphenol content: 0.0%, the residual o-phenylphenol content: 0.4%, the residual resorcinol content: 9.5%, the proportion of each constituent unit in the co-condensate; o-phenylphenol: 5.40, methylene group: 1.33.

[Rubber Composition for Tires Containing Co-Condensate]

<Co-Condensate Obtained in Production Example 1>

Using the resorcinol resin 1 or 2 shown in the following Table 1 as a resin adhesive, an unvulcanized rubber composition was produced. The resorcinol resin 1 is the co-condensate produced in Production Example 1, and the resorcinol resin 2 is a resin adhesive of a conventional commercial product, SUMIKANOL 620 (manufactured by Taoka Chemical Co., Ltd.).

TABLE 1

| | Resorcinol Resin 1 | Resorcinol Resin 2 |
|---|---|---|
| Kind of Resin Adhesive | Production Example 1 | SUMIKANOL 620 |
| Softening Point (° C.) | 123 | 103 |
| Free Phenols (% by mass) | 0.4 | 10.1 |
| Free Resorcinol (% by mass) | 9.5 | 8.2 |
| Species of Residual Solvent | toluene | toluene |
| Residual Solvent Amount (% by mass) | 1.1 | 2.2 |

In Table 1, free phenols are as the total amount of p-tert-butylphenol and o-phenylphenol in Production Example 1, and are as the total amount of p-tert-octylphenol and p-cresol in the case of SUMIKANOL 620. In Table 1, the residual amount is the residual amount (% by mass) of the solvent.

<Zinc Oxide Mixed in Rubber Composition for Tires>

As zinc oxide to be mixed in the rubber composition for tires, those having a specific surface area shown in Table 2 were used. The specific surface area is the nitrogen adsorption specific surface area measured according to the BET method, and the specific surface area of zinc oxide (B) is the nitrogen adsorption specific surface area measured according to the BET method defined in ASTM D4567-03 (2007). The results are shown in Table 2.

TABLE 2

| Species of Zinc Oxide | Specific Surface Area ($m^2/g$) |
|---|---|
| Zinc Oxide 1 | 6 |
| Zinc Oxide 2 | 7 |
| Zinc Oxide 3 | 8 |
| Zinc Oxide 4 | 9 |
| Zinc Oxide 5 | 10 |
| Zinc Oxide 6 | 25 |
| Zinc Oxide 7 | 45 |
| Zinc Oxide 8 | 54 |
| Zinc Oxide 9 | 80 |
| Zinc Oxide 10 | 110 |
| Zinc Oxide 11 | 3 |
| Zinc Oxide 12 | 5 |

<Production of Unvulcanized Rubber Composition>

According to the compounding prescriptions shown in Table 3-1, Table 3-2 and Table 4, the components except insoluble sulfur, the vulcanization accelerator and the methylene donor compound, and the resin adhesive shown in Table 1 were mixed to prepare a mixture, using a press kneader manufactured by Toshin Co., Ltd., and the mixture was discharged out when having reached 160° C.

Next, insoluble sulfur, the vulcanization accelerator and the methylene donor were added to the resultant mixture and mixed, using a 6-inch open roll manufactured by Kansai Roll Co., Ltd. kept heated at 60° C., to prepare a rubber composition for coating steel cords.

[Method for Evaluation of Rubber Composition for Tires Containing Co-Condensate]

Using the unvulcanized rubber composition obtained in the manner as above, samples of vulcanized rubber and a rubber-steel cord composite were produced and evaluated in the manner as mentioned below. As the steel cord, a brass-plated one having a structure of 1×3×0.3 mm and zinc/copper=63/37 (ratio by weight) was used. The initial adhesiveness and the wet-heat adhesiveness were evaluated according to the methods mentioned below.

(a) Initial Adhesiveness

The steel cords were aligned in parallel at intervals of 12.5 mm, and the steel cords were covered with the rubber composition on both the upper and the lower sides, and vulcanized at 160° C. for 7 minutes to bond the rubber composition to the steel cords. In that manner, a rubber-metal composite with steel cords embedded in a rubber sheet having a thickness of 1 mm was obtained (where the steel cords were aligned at intervals of 12.5 mm in the sheet surface at the center in the thickness direction of the rubber sheet). Subsequently, according to ASTM D 2229, the steel cords were drawn off from each sample just after vulcanization, and the coating ratio with rubber adhering to the steel cords was determined in 0 to 100% in visual observation, and this was employed as a reference index of initial adhesiveness. The results are expressed as an index based on 100 given to Comparative Example 1. Samples having a larger index value have more excellent initial adhesiveness.

Initial Adhesiveness Index={(coating ratio with rubber adhering to metal cord of sample)/(coating ratio with rubber adhering to metal cord of Comparative Example 1)}×100

(b) Wet-Heat Adhesiveness (Adhesiveness after Wet-Heat Aging)

The metal cords were aligned in parallel at intervals of 12.5 mm, and the metal cords were covered with the rubber composition on both the upper and the lower sides, and vulcanized at 160° C. for 20 minutes to bond the rubber composition to the metal cords. In that manner, a metal cord-rubber composite with metal cords embedded in a rubber sheet having a thickness of 1 mm was obtained (where the metal cords were aligned in parallel at intervals of 12.5 mm in the sheet surface at the center in the thickness direction of the rubber sheet). The metal cord-rubber composite was aged in an atmosphere at 75° C. and a relative humidity of 95% for 10 days, and then according to ASTM D 2229, the metal cords were drawn off from each sample, and the coating ratio with rubber adhering to the metal cords was determined in 0 to 100% in visual observation, and this was employed as a reference index of wet-heat degradation. The results are expressed as an index based on 100 given to Comparative Example 1. Samples having a larger index value have more excellent wet-heat adhesiveness. That is, the samples are more excellent in wet-heat degradation resistance.

Wet-heat Adhesiveness Index={(coating ratio with rubber adhering to metal cord of sample)/(coating ratio with rubber adhering to metal cord of sample of Comparative Example 1)}×100

(c) Mooney Viscosity of Unvulcanized Rubber

The viscosity of the unvulcanized rubber obtained according to the compounding prescription shown in Examples 19 to 22 was measured according to JIS K 6300-1:2001 (Mooney viscosity, Mooney scorch time). The results are expressed as an index based on 100 given to Example 19. A larger index value indicates that the viscosity of the unvulcanized rubber is higher.

TABLE 3-1

|  |  | Example |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| Compounding Prescription (part by mass) | Natural Rubber *1 | 100 | 100 | 100 | 100 | 100 | 100 | 100 | 100 | 100 | 100 |
|  | Isoprene Rubber *2 | 0 | 0 | 0 | 0 | 0 | 0 | 0 | 0 | 0 | 0 |
|  | Carbon Black *3 | 55 | 55 | 55 | 55 | 55 | 55 | 55 | 55 | 55 | 55 |
|  | Zinc Oxide 1 (part by mass) *4 | 8 | 0 | 0 | 0 | 0 | 0 | 0 | 0 | 0 | 0 |
|  | Zinc Oxide 2 (part by mass) *5 | 0 | 8 | 0 | 0 | 0 | 0 | 0 | 0 | 0 | 0 |
|  | Zinc Oxide 3 (part by mass) *6 | 0 | 0 | 8 | 0 | 0 | 0 | 0 | 0 | 0 | 0 |
|  | Zinc Oxide 4 (part by mass) *7 | 0 | 0 | 0 | 8 | 0 | 0 | 0 | 0 | 0 | 0 |
|  | Zinc Oxide 5 (part by mass) *8 | 0 | 0 | 0 | 0 | 8 | 0 | 0 | 0 | 0 | 0 |
|  | Zinc Oxide 6 (part by mass) *9 | 0 | 0 | 0 | 0 | 0 | 8 | 0 | 0 | 0 | 0 |
|  | Zinc Oxide 7 (part by mass) *10 | 0 | 0 | 0 | 0 | 0 | 0 | 8 | 0 | 0 | 0 |
|  | Zinc Oxide 8 (part by mass) *11 | 0 | 0 | 0 | 0 | 0 | 0 | 0 | 8 | 0 | 0 |
|  | Zinc Oxide 9 (part by mass) *12 | 0 | 0 | 0 | 0 | 0 | 0 | 0 | 0 | 8 | 0 |
|  | Zinc Oxide 10 (part by mass) *13 | 0 | 0 | 0 | 0 | 0 | 0 | 0 | 0 | 0 | 8 |
|  | Zinc Oxide 11 (part by mass) *14 | 0 | 0 | 0 | 0 | 0 | 0 | 0 | 0 | 0 | 0 |
|  | Zinc Oxide 12 (part by mass) *15 | 0 | 0 | 0 | 0 | 0 | 0 | 0 | 0 | 0 | 0 |
|  | Resorcinol Resin 1 *16 | 2 | 2 | 2 | 2 | 2 | 2 | 2 | 2 | 2 | 2 |
|  | Resorcinol Resin 2 *17 | 0 | 0 | 0 | 0 | 0 | 0 | 0 | 0 | 0 | 0 |
|  | DCPD Resin *18 | 0 | 0 | 0 | 0 | 0 | 0 | 0 | 0 | 0 | 0 |
|  | Antiaging Agent *19 | 2 | 2 | 2 | 2 | 2 | 2 | 2 | 2 | 2 | 2 |
|  | Vulcanization Accelerator *20 | 1 | 1 | 1 | 1 | 1 | 1 | 1 | 1 | 1 | 1 |
|  | Sulfur *21 | 7 | 7 | 7 | 7 | 7 | 7 | 7 | 7 | 7 | 7 |
|  | Cobalt Fatty Acid Salt *22 | 1 | 1 | 1 | 1 | 1 | 1 | 1 | 1 | 1 | 1 |
|  | Methylene Donor Compound *23 | 3 | 3 | 3 | 3 | 3 | 3 | 3 | 3 | 3 | 3 |
|  | Presence or Absence of SVHC Candidate Defined in REACH | no | no | no | no | no | no | no | no | no | no |
| Evaluation Results | Initial Adhesiveness (Index) | 104 | 104 | 105 | 105 | 106 | 107 | 110 | 110 | 111 | 106 |
|  | Wet-Heat Adhesiveness (Index) | 116 | 117 | 117 | 118 | 118 | 120 | 120 | 123 | 119 | 113 |

|  |  | Example |  |  |  |  |  |  |  |
|---|---|---|---|---|---|---|---|---|---|
|  |  | 11 | 12 | 13 | 14 | 15 | 16 | 17 | 18 |
| Compounding Prescription (part by mass) | Natural Rubber *1 | 100 | 100 | 100 | 100 | 100 | 80 | 100 | 100 |
|  | Isoprene Rubber *2 | 0 | 0 | 0 | 0 | 0 | 20 | 0 | 0 |
|  | Carbon Black *3 | 55 | 55 | 55 | 55 | 55 | 55 | 55 | 55 |
|  | Zinc Oxide 1 (part by mass) *4 | 6 | 12 | 8 | 8 | 8 | 8 | 4 | 4 |
|  | Zinc Oxide 2 (part by mass) *5 | 0 | 0 | 0 | 0 | 0 | 0 | 0 | 0 |
|  | Zinc Oxide 3 (part by mass) *6 | 0 | 0 | 0 | 0 | 0 | 0 | 0 | 0 |
|  | Zinc Oxide 4 (part by mass) *7 | 0 | 0 | 0 | 0 | 0 | 0 | 0 | 0 |
|  | Zinc Oxide 5 (part by mass) *8 | 0 | 0 | 0 | 0 | 0 | 0 | 4 | 0 |
|  | Zinc Oxide 6 (part by mass) *9 | 0 | 0 | 0 | 0 | 0 | 0 | 0 | 0 |
|  | Zinc Oxide 7 (part by mass) *10 | 0 | 0 | 0 | 0 | 0 | 0 | 0 | 4 |
|  | Zinc Oxide 8 (part by mass) *11 | 0 | 0 | 0 | 0 | 0 | 0 | 0 | 0 |
|  | Zinc Oxide 9 (part by mass) *12 | 0 | 0 | 0 | 0 | 0 | 0 | 0 | 0 |
|  | Zinc Oxide 10 (part by mass) *13 | 0 | 0 | 0 | 0 | 0 | 0 | 0 | 0 |
|  | Zinc Oxide 11 (part by mass) *14 | 0 | 0 | 0 | 0 | 0 | 0 | 0 | 0 |
|  | Zinc Oxide 12 (part by mass) *15 | 0 | 0 | 0 | 0 | 0 | 0 | 0 | 0 |
|  | Resorcinol Resin 1 *16 | 2 | 2 | 0.2 | 8 | 2 | 2 | 2 | 2 |
|  | Resorcinol Resin 2 *17 | 0 | 0 | 0 | 0 | 0 | 0 | 0 | 0 |
|  | DCPD Resin *18 | 0 | 0 | 0 | 0 | 2 | 2 | 2 | 2 |
|  | Antiaging Agent *19 | 2 | 2 | 2 | 2 | 2 | 2 | 2 | 2 |
|  | Vulcanization Accelerator *20 | 1 | 1 | 1 | 1 | 1 | 1 | 1 | 1 |
|  | Sulfur *21 | 7 | 7 | 7 | 7 | 7 | 7 | 7 | 7 |

TABLE 3-1-continued

|  |  |  |  |  |  |  |  |  |  |
|---|---|---|---|---|---|---|---|---|---|
|  | Cobalt Fatty Acid Salt *22 | 1 | 1 | 1 | 1 | 1 | 1 | 1 | 1 |
|  | Methylene Donor Compound *23 | 3 | 3 | 3 | 3 | 3 | 3 | 3 | 3 |
|  | Presence or Absence of SVHC Candidate Defined in REACH | no | no | no | no | no | no | no | no |
| Evaluation Results | Initial Adhesiveness (Index) | 104 | 105 | 102 | 102 | 105 | 102 | 105 | 111 |
|  | Wet-Heat Adhesiveness (Index) | 113 | 113 | 112 | 116 | 120 | 114 | 117 | 123 |

TABLE 3-2

|  |  | Comparative Example | | | | | | | | | |
|---|---|---|---|---|---|---|---|---|---|---|---|
|  |  | 1 | 2 | 3 | 4 | 5 | 6 | 7 | 8 | 9 | 10 |
| Compounding Prescription (part by mass) | Natural Rubber *1 | 100 | 100 | 100 | 100 | 100 | 100 | 100 | 100 | 100 | 100 |
|  | Isoprene Rubber *2 | 0 | 0 | 0 | 0 | 0 | 0 | 0 | 0 | 0 | 0 |
|  | Carbon Black *3 | 55 | 55 | 55 | 55 | 55 | 55 | 55 | 55 | 55 | 55 |
|  | Zinc Oxide 1 (part by mass) *4 | 0 | 0 | 0 | 8 | 0 | 0 | 0 | 0 | 0 | 0 |
|  | Zinc Oxide 2 (part by mass) *5 | 0 | 0 | 0 | 0 | 8 | 0 | 0 | 0 | 0 | 0 |
|  | Zinc Oxide 3 (part by mass) *6 | 0 | 0 | 0 | 0 | 0 | 8 | 0 | 0 | 0 | 0 |
|  | Zinc Oxide 4 (part by mass) *7 | 0 | 0 | 0 | 0 | 0 | 0 | 8 | 0 | 0 | 0 |
|  | Zinc Oxide 5 (part by mass) *8 | 0 | 0 | 0 | 0 | 0 | 0 | 0 | 8 | 0 | 0 |
|  | Zinc Oxide 6 (part by mass) *9 | 0 | 0 | 0 | 0 | 0 | 0 | 0 | 0 | 8 | 0 |
|  | Zinc Oxide 7 (part by mass) *10 | 0 | 0 | 0 | 0 | 0 | 0 | 0 | 0 | 0 | 8 |
|  | Zinc Oxide 8 (part by mass) *11 | 0 | 0 | 0 | 0 | 0 | 0 | 0 | 0 | 0 | 0 |
|  | Zinc Oxide 9 (part by mass) *12 | 0 | 0 | 0 | 0 | 0 | 0 | 0 | 0 | 0 | 0 |
|  | Zinc Oxide 10 (part by mass) *13 | 0 | 0 | 0 | 0 | 0 | 0 | 0 | 0 | 0 | 0 |
|  | Zinc Oxide 11 (part by mass) *14 | 8 | 0 | 0 | 0 | 0 | 0 | 0 | 0 | 0 | 0 |
|  | Zinc Oxide 12 (part by mass) *15 | 0 | 8 | 8 | 0 | 0 | 0 | 0 | 0 | 0 | 0 |
|  | Resorcinol Resin 1 *16 | 0 | 0 | 2 | 0 | 0 | 0 | 0 | 0 | 0 | 0 |
|  | Resorcinol Resin 2 *17 | 0 | 0 | 0 | 0 | 0 | 0 | 0 | 0 | 0 | 0 |
|  | DCPD Resin *18 | 0 | 0 | 0 | 0 | 0 | 0 | 0 | 0 | 0 | 0 |
|  | Antiaging Agent *19 | 2 | 2 | 2 | 2 | 2 | 2 | 2 | 2 | 2 | 2 |
|  | Vulcanization Accelerator *20 | 1 | 1 | 1 | 1 | 1 | 1 | 1 | 1 | 1 | 1 |
|  | Sulfur *21 | 7 | 7 | 7 | 7 | 7 | 7 | 7 | 7 | 7 | 7 |
|  | Cobalt Fatty Acid Salt *22 | 1 | 1 | 1 | 1 | 1 | 1 | 1 | 1 | 1 | 1 |
|  | Methylene Donor Compound *23 | 3 | 3 | 3 | 3 | 3 | 3 | 3 | 3 | 3 | 3 |
|  | Presence or Absence of SVHC Candidate Defined in REACH | no | no | no | no | no | no | no | no | no | no |
| Evaluation Results | Initial Adhesiveness (Index) | 100 | 100 | 100 | 100 | 100 | 101 | 101 | 100 | 100 | 102 |
|  | Wet-Heat Adhesiveness (Index) | 100 | 100 | 110 | 101 | 102 | 102 | 103 | 101 | 102 | 102 |

|  |  | Comparative Example | | | | | | Reference Example |
|---|---|---|---|---|---|---|---|---|
|  |  | 11 | 12 | 13 | 14 | 15 | 16 | 1 |
| Compounding Prescription (part by mass) | Natural Rubber *1 | 100 | 100 | 100 | 100 | 100 | 100 | 100 |
|  | Isoprene Rubber *2 | 0 | 0 | 0 | 0 | 0 | 0 | 0 |
|  | Carbon Black *3 | 55 | 55 | 55 | 55 | 55 | 55 | 55 |
|  | Zinc Oxide 1 (part by mass) *4 | 0 | 0 | 0 | 3 | 15 | 8 | 8 |
|  | Zinc Oxide 2 (part by mass) *5 | 0 | 0 | 0 | 0 | 0 | 0 | 0 |
|  | Zinc Oxide 3 (part by mass) *6 | 0 | 0 | 0 | 0 | 0 | 0 | 0 |
|  | Zinc Oxide 4 (part by mass) *7 | 0 | 0 | 0 | 0 | 0 | 0 | 0 |
|  | Zinc Oxide 5 (part by mass) *8 | 0 | 0 | 0 | 0 | 0 | 0 | 0 |
|  | Zinc Oxide 6 (part by mass) *9 | 0 | 0 | 0 | 0 | 0 | 0 | 0 |
|  | Zinc Oxide 7 (part by mass) *10 | 0 | 0 | 0 | 0 | 0 | 0 | 0 |
|  | Zinc Oxide 8 (part by mass) *11 | 8 | 0 | 0 | 0 | 0 | 0 | 0 |
|  | Zinc Oxide 9 (part by mass) *12 | 0 | 8 | 0 | 0 | 0 | 0 | 0 |
|  | Zinc Oxide 10 (part by mass) *13 | 0 | 0 | 8 | 0 | 0 | 0 | 0 |
|  | Zinc Oxide 11 (part by mass) *14 | 0 | 0 | 0 | 0 | 0 | 0 | 0 |
|  | Zinc Oxide 12 (part by mass) *15 | 0 | 0 | 0 | 0 | 0 | 0 | 0 |
|  | Resorcinol Resin 1 *16 | 0 | 0 | 0 | 2 | 2 | 15 | 0 |
|  | Resorcinol Resin 2 *17 | 0 | 0 | 0 | 0 | 0 | 0 | 2 |
|  | DCPD Resin *18 | 0 | 0 | 0 | 0 | 0 | 0 | 0 |
|  | Antiaging Agent *19 | 2 | 2 | 2 | 2 | 2 | 2 | 2 |
|  | Vulcanization Accelerator *20 | 1 | 1 | 1 | 1 | 1 | 1 | 1 |
|  | Sulfur *21 | 7 | 7 | 7 | 7 | 7 | 7 | 7 |
|  | Cobalt Fatty Acid Salt *22 | 1 | 1 | 1 | 1 | 1 | 1 | 1 |
|  | Methylene Donor Compound *23 | 3 | 3 | 3 | 3 | 3 | 3 | 3 |
|  | Presence or Absence of SVHC Candidate Defined in REACH | no | no | no | no | no | no | yes |
| Evaluation Results | Initial Adhesiveness (Index) | 102 | 105 | 105 | 100 | 98 | 98 | 102 |
|  | Wet-Heat Adhesiveness (Index) | 104 | 104 | 106 | 110 | 106 | 105 | 114 |

TABLE 4

|  |  | Example | | | |
|---|---|---|---|---|---|
|  |  | 19 | 20 | 21 | 22 |
| Compounding Prescription (part by mass) | Natural Rubber *1 | 100 | 100 | 100 | 100 |
|  | Carbon Black *3 | 50 | 45 | 40 | 35 |
|  | Silica *24 | 0 | 5 | 10 | 15 |
|  | Proportion of Carbon Black in Filler (% by mass) | 100 | 90 | 80 | 70 |
|  | Zinc Oxide 1 (part by mass) *4 | 8 | 8 | 8 | 8 |
|  | Resorcinol Resin 1 *16 | 2 | 2 | 2 | 2 |
|  | DCPD Resin *18 | 0 | 0 | 0 | 0 |
|  | Antiaging Agent *19 | 2 | 2 | 2 | 2 |
|  | Vulcanization Accelerator *20 | 1 | 1 | 1 | 1 |
|  | Sulfur *21 | 7 | 7 | 7 | 7 |
|  | Cobalt Fatty Acid Salt *22 | 1 | 1 | 1 | 1 |
|  | Methylene Donor Compound *23 | 3 | 3 | 3 | 3 |
| Evaluation Results | Unvulcanized Rubber Viscosity | 100 | 114 | 121 | 125 |

The following components were used in Table 3-1, Table 3-2 and Table 4.
*1 Natural rubber: SMR-CV60
*2 Isoprene rubber: IR2200 manufactured by JSR Corporation
*3 Carbon black: "Seast 300" (HAF-LS grade) manufactured by Tokai Carbon Black Co., Ltd.
*4 Zinc oxide 1: sorted zinc oxide, manufactured by Hakusui Tech Co., Ltd.
*5 Zinc oxide 2: sorted zinc oxide, manufactured by Hakusui Tech Co., Ltd.
*6 Zinc oxide 3: sorted zinc oxide, manufactured by Hakusui Tech Co., Ltd.
*7 Zinc oxide 4: sorted zinc oxide, manufactured by Hakusui Tech Co., Ltd.
*8 Zinc oxide 5: ultrafine particulate zinc oxide, manufactured by Hakusui Tech Co., Ltd.
*9 Zinc oxide 6: active zinc oxide, manufactured by Seido Chemical Industry Co., Ltd.
*10 Zinc oxide 7: active zinc oxide, manufactured by Seido Chemical Industry Co., Ltd.
*11 Zinc oxide 8: active zinc oxide, manufactured by SB Chemical Co., Ltd.
*12 Zinc oxide 9: active zinc oxide, manufactured by Hanil Chemical Co., Ltd.
*13 Zinc oxide 10: active zinc oxide, manufactured by Hanil Chemical Co., Ltd.
*14 Zinc oxide 11: Zinc oxide grade 2, manufactured by Seido Chemical Industry Co., Ltd.
*15 Zinc oxide 12: Zinc oxide grade 2, manufactured by Seido Chemical Industry Co., Ltd.
*16 Resorcinol resin 1: resorcinol resin produced in Production Example 1
*17 Resorcinol resin 2: "Sumikanol 620" manufactured by Taoka Chemical Co., Ltd.
*18 DCPD resin: dicyclopentadiene resin, "Quinton 1105 Manufactured by Zeon Corporation
*19 Antiaging agent: "Nocrac 6C" manufactured by Ouchi Shinko Chemical Industrial Co., Ltd.
*20 Vulcanization accelerator: N,N-dicyclohexyl-2-benzothiazolyl sulfenamide (reagent)
*21 Insoluble sulfur: "Crystex HS OT-20" manufactured by Flexsys Co., Ltd.
*22 Cobalt fatty acid salt: cobalt stearate (reagent), 0.09 parts by mass as cobalt content based on 100 parts by mass of rubber component
*23 Methylene donor compound: modified etherified methylolmelamine resin "Sumikanol 507AP" manufactured by Taoka Chemical Co., Ltd.
*24 Silica: "Nipsil-AQ" manufactured by Tosoh Silica Corporation

[Results of Evaluation of Rubber Composition for Tires Containing Co-Condensate]

According to Examples, it is known that, by compounding a specific compounding amount of the resorcinol resin 1 in the rubber composition for tires, the wet-heat adhesiveness can be greatly improved as compared with that of the rubber compositions for tires of Comparative Examples 1 and 2 in which a resorcinol resin is not mixed.

In addition, it is also known that the rubber composition for tires using the resorcinol resin 1 can exhibit effects of initial adhesiveness and wet-heat adhesiveness comparable to those of the rubber composition for tires of Reference Example using the conventional resorcinol resin 2.

Further, it is known that, by using zinc oxide whose nitrogen adsorption specific surface area ($N_2SA$) by the BET method falls within a range of 6 $m^2/g$ or more and 110 $m^2/g$ or less, wet-heat adhesiveness can be improved along with initial adhesiveness.

In addition, it is known that, as in Comparative Example 15 where the BET specific surface area of zinc oxide falls within a specific range but the compounding amount thereof exceeds a suitable amount, the initial adhesiveness lowers. Further, it is known that, as in Comparative Example 13 where the resorcinol resin 1 of Production Example 1 is used but the compounding amount of the resorcinol resin exceeds a suitable amount, the initial adhesiveness lowers.

From the above, it is known that the compounding amount of the zinc oxide (B) is good to be 5 parts by mass or more and 13 parts by mass or less based on 100 parts by mass of the rubber component (A), and when the compounding amount of the co-condensate (C) is 0.1 parts by mass or more and 10 parts by mass or less based on 100 parts by mass of the rubber component (A), good results can be obtained both in point of the initial adhesiveness and the wet-heat adhesiveness.

Further, the total amount of the unreacted monomers except free resorcinol and the residual solvent contained in the rubber composition for tires of the present invention is 0.03% by mass based on the rubber component, and is much smaller than 0.17% by mass, and as compared with the total amount, 0.246% by mass of the unreacted monomers except free resorcinol and the residual solvent contained in the rubber composition compounded with a conventional substance (SUMIKANOL 620) in Reference Example 1, generation of odor in kneading the unvulcanized rubber composition is greatly reduced and the equipment investment for working environment protection can be greatly reduced.

INDUSTRIAL APPLICABILITY

The rubber composition for tires of the present invention is favorably used for rubber products, especially for composites of metal cords and rubber, such as reinforcing materials for carcass or belt of tires. In particular, in the case where the rubber composition for tires of the present invention is applied to a metal cord-rubber composite for use for tires for trucks and buses, and tires for passenger cars, especially for belts and others for radial tires for passenger cars, the adhesiveness to rubber can be enhanced.

The invention claimed is:

1. A rubber composition for tires, which is prepared by mixing a rubber component (A), zinc oxide (B), and a co-condensate (C) having a softening point of 150° C. or lower and containing a p-tert-butylphenol-derived constituent unit represented by the following formula (1), an o-phenylphenol-derived constituent unit represented by the following formula (2) and a resorcinol-derived constituent unit represented by the following formula (3), wherein:

the zinc oxide (B) is one prepared by mixing one having a nitrogen adsorption specific surface area ($N_2SA$) measured according to BET method of 40 m$^2$/g or more and 55 m$^2$/g or less and another having a nitrogen adsorption specific surface area ($N_2SA$) measured according to the BET method of 6 m$^2$/g or more and 10 m$^2$/g or less, the mixing amount of the zinc oxide (B) is 5 parts by mass or more and 13 parts by mass or less based on 100 parts by mass of the rubber component (A), and the mixing amount of the co-condensate (C) is 0.1 parts by mass or more and 10 parts by mass or less based on 100 parts by mass of the rubber component (A):

[Chemical Formula 1]

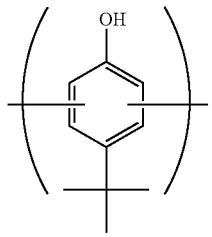

(1)

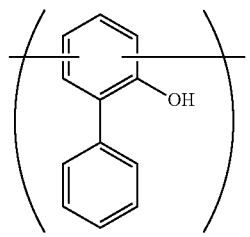

(2)

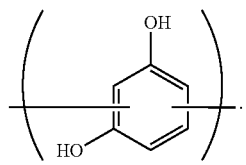

(3)

2. The rubber composition for tires according to claim 1, a filler is further mixed, wherein the filler is selected from carbon black and an inorganic filler, and the proportion of carbon black in the filler is 80% by mass or more.

3. The rubber composition for tires according to claim 1, wherein the mixing amount of the zinc oxide (B) is 6 parts by mass or more and 12 parts by mass or less based on 100 parts by mass of the rubber component (A).

4. The rubber composition for tires according to claim 1 wherein the mixing amount of the co-condensate (C) is 0.2 parts by mass or more and 8 parts by mass or less based on 100 parts by mass of the rubber component (A).

5. The rubber composition for tires according to claim 1, wherein the softening point of the co-condensate (C) is 80° C. or higher and 150° C. or lower.

6. The rubber composition for tires according to claim 1, wherein the softening point of the co-condensate (C) is 80° C. or higher and 140° C. or lower.

7. A tire using the rubber composition for tires of claim 1.